Aug. 26, 1941. D. B. WHITNEY 2,253,671
VEHICLE HEATING AND WINDSHIELD DEFROSTING DEVICE
Filed Aug. 28, 1939
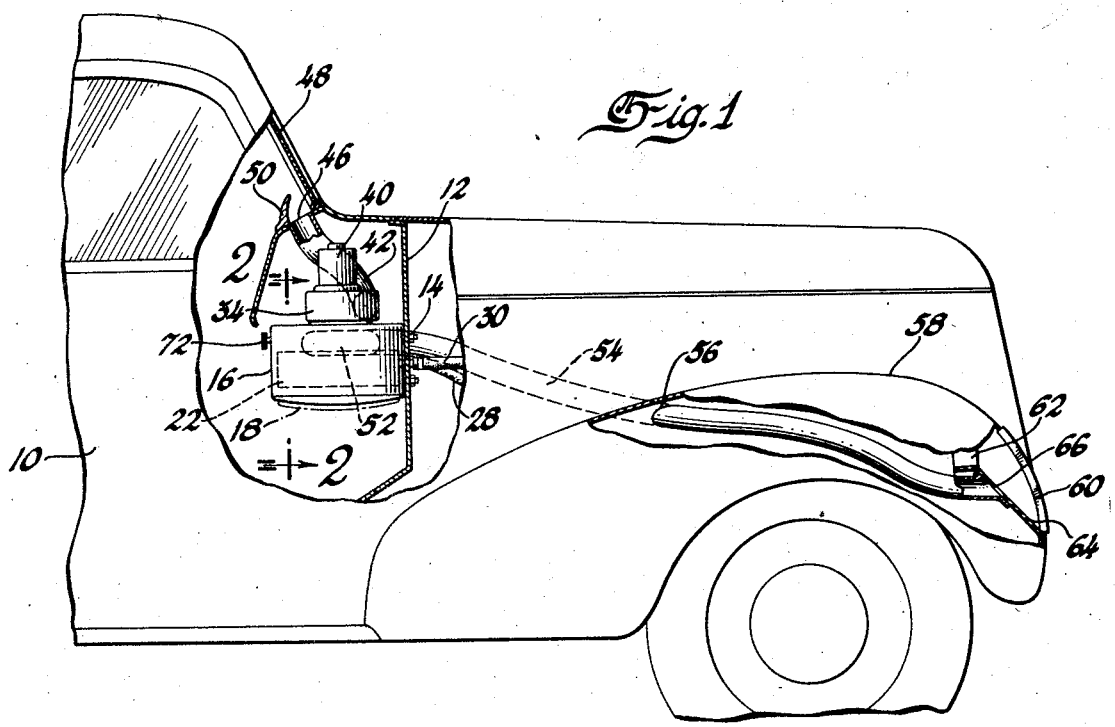
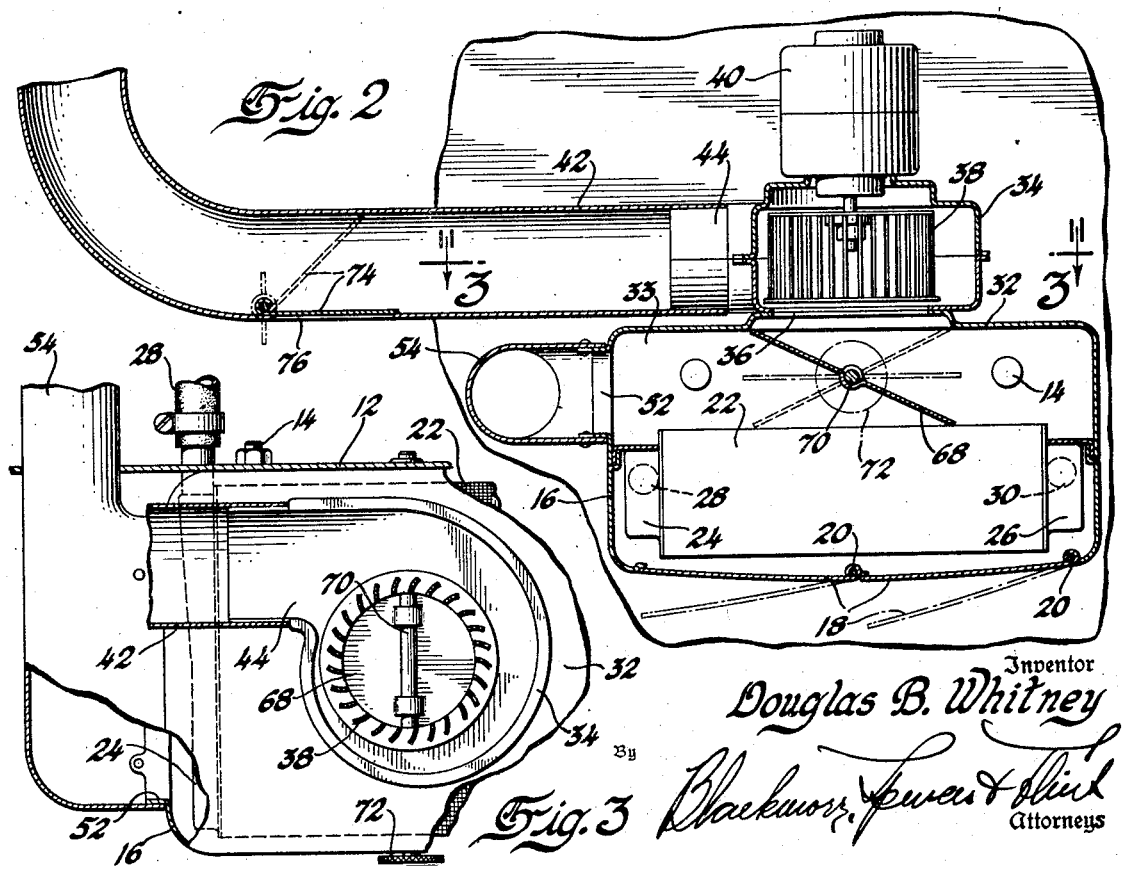

Patented Aug. 26, 1941

2,253,671

UNITED STATES PATENT OFFICE 2,253,671

VEHICLE HEATING AND WINDSHIELD DEFROSTING DEVICE

Douglas B. Whitney, Lockport, N. Y., assignor to General Motors Corporation, Detroit, Mich., a corporation of Delaware Application August 28, 1939, Serial No. 292,165

4 Claims. (Cl. 98—2)

This invention relates to vehicle heating and windshield defrosting devices, and has for one of its objects the provision of such a device wherein fresh air taken from the outside of the vehicle, preferably from a point at the front thereof, is forced by the forward movement of the vehicle into a chamber formed in a heater casing, from which chamber the air may be caused to flow either through a heat radiating member into the vehicle body compartment for the purpose of heating and ventilating the latter, or to flow through a passageway leading from the chamber to the windshield for the purpose of removing or preventing the accumulation of condensed moisture or frost on the windshield. A blower is associated with the passageway to the windshield so that in the event the amount of air being forced in by the forward movement of the vehicle is insufficient to accomplish either of these purposes, the blower may be operated to increase the amount and velocity of the air flowing through the passageway. An arrangement of valves is provided in the chamber and in the passageway whereby by setting these valves to different positions, various combinations of the use of either fresh unheated air from outside the vehicle or recirculated heated air from within the body compartment, or mixtures of the two, may be obtained for heating and ventilating the body compartment or for defrosting or defogging the windshield.

The above and other objects of the invention will be more clearly understood upon reference to the specification and accompanying drawing, in which Fig. 1 is a side elevational view of the front part of an automobile, with parts broken away to show my improved heater and ventilator applied thereto.

Fig. 2 is a sectional view, taken on the line 2—2 of Fig. 1.

Fig. 3 is a sectional view, taken on the line 3—3 of Fig. 2.

The reference numeral 10 designates an automobile body having therein a dash board 12 separating the engine compartment from the body compartment. Mounted upon the dash board within the body compartment by means of bolts 14 is a heater casing 16 of generally rectangular shape, having a large opening formed in its bottom wall. A pair of doors 18 hinged to the casing at 20 may be adjusted to cover or uncover this opening as desired.

Located in the lower part of the casing is a heat transfer member 22 of any desired type which will provide vertically extending air passages. That shown has an inlet header 24 on one side and an outlet header 26 on the opposite side, which headers are connected by pipes 28 and 30 respectively with the cooling circulating system of the engine, in a manner whereby hot water will be caused to circulate through the heat transfer member. The upper face of the latter is spaced a sufficient distance below the top wall 32 of the casing to form a chamber 33 therebetween, the purpose of which will be described below.

Supported on the top wall 32 of the casing is a blower housing 34, there being a centrally located opening 36 formed in the top wall of the casing so that there may be communication between the interior of the latter and the blower housing. Located within the housing is a blower rotor 38 adapted to be driven by an electric motor 40, and a tube 42 is connected to the outlet 44 of the blower housing and conducts air from the latter up to openings 46 provided at the bottom and inside of the windshield 48, where the air is directed against the windshield by deflectors 50 for the purpose of removing condensation or frost from the windshield.

Formed in one of the side walls of the heater casing, at a point where it will communicate with the chamber 33, is an air inlet opening 52. Connected to this opening is a conduit 54 which extends forwardly through the dash board and through the engine compartment to a point 56 where it passes outwardly to beneath the fender 58. Secured in the forward part of the fender or in any other part of the front of the car is a grille member 60, through which air may enter to flow through the car radiator 62, there being a plate 64 located behind the grille in an angular position whereby it causes the air entering the grille to flow upwardly toward the radiator. The front end of the conduit 54 is connected to the plate 64, there being an opening 66 provided in the plate so that some of the air entering through the grille may flow through the conduit and into the heater casing, to provide a supply of fresh air from outside the car for heating or ventilating the latter, or for defrosting the windshield.

To control the flow of this air, an adjustable valve 68 is provided in the chamber 33, the valve being mounted upon a shaft 70 which is pivotally supported in the side walls of the heater casing, there being a handle or knob 72 located on the end of the shaft nearest to the occupants of the car, to permit moving the valve to the positions shown in the full and dotted lines in Fig. 2.

The operation of the device is as follows. Assuming that the valve 68 has been set to the position shown in the full lines in Fig. 2, and that the doors 18 have been opened to uncover or partially uncover the opening in the bottom wall of the heater casing, when the car is in motion some of the air entering through the grille 60 at the front thereof will be forced through the opening 66 in the plate 64 and through the tube 54 into the chamber 33, from which it will flow downwardly through the vertically extending air passages in the heat radiating member, thereby becoming heated and flowing into the space within the car body for the purpose of heating the latter with fresh air from outside the car. The blower need not be operated unless it is desired to discharge air against the windshield for defrosting or defogging purposes, in which case rotation of the blower while the valve 68 is set in the full line position will cause air to be drawn upwardly through the portion of the heat transfer member which is to the right of the valve, as shown in Fig. 2, this air becoming heated in passing therethrough and then being forced by the blower through the tube 42 up to the windshield 48.

If it is desired to utilize some or all of this heated air being discharged by the blower for the purpose of heating the interior of the car, a valve 74, pivotally supported in the tube 42 and normally serving to close an opening 76 in the tube, may be moved to the dotted line position shown in Fig. 2 thereby uncovering the opening 76 and permitting the heated air to flow out through this opening into the space within the car body.

When the valve 68 has been set to the other extreme position, shown in dotted lines in Fig. 2, and the blower is not being operated, the major portion of the outside air entering through the conduit 54 will flow upwardly from the heater casing into the blower housing and thence up through the tube 42 to the windshield, so that there will be a flow of unheated air from outside the car over the inner surface of the windshield which will serve to keep the latter free from condensed moisture or frost. Should the amount of air entering through the conduit 54 be insufficient to accomplish this purpose, the blower may then be operated and will serve to increase greatly the quantity of air being discharged against the windshield. With the valve 68 set in this position, all of the air flowing to the windshield will be unheated, which is desirable under certain temperature conditions wherein it is more satisfactory to defrost or defog the windshield with unheated air than it is with heated air.

By setting the valve 68 to the intermediate position shown by the dot and dash lines in Fig. 2, a somewhat different operation may be obtained. Approximately half of the air entering through the conduit 54 will flow downwardly through the passages in the heat radiating member 22 and will serve to heat the interior of the car body with fresh air from outside of the car, while the other half will flow upwardly into the blower housing and thence through the tube 42 to the windshield for the purpose of keeping the latter clear of fog or frost. If more air is desired for this latter purpose, the blower may then be operated and will serve to draw into the blower housing not only fresh air entering through the conduit 54, but also heated air drawn upwardly through the heat radiating member 22.

It will be understood, of course, that various changes may be made in the details of the construction without departing from the spirit and scope of the appended claims.

I claim:

1. In a car heating and windshield defrosting device, the combination of a casing located within the car body, a heat radiating member mounted within the casing, a blower supported on the casing, a chamber located in the casing between the heat radiating member and the blower, the inlet to the blower communicating with the chamber, a tube leading from the discharge side of the blower to the windshield, an air conduit adapted to conduct air from outside of the car body to within the chamber, means adapted to admit air from within the car body through the heat radiating member to the blower, and regulating means located within the chamber, said regulating means being adjustable and being adapted when set in one position to cause heated air from within the car body to be discharged by the blower against the windshield, and when set in another position to cause unheated air from outside of the car body to be discharged by the blower against the windshield.

2. In a heating device for vehicles, a casing having a chamber formed therein located inside the vehicle body, a conduit adapted to conduct air from outside the body into said chamber, a heat radiating member located in the casing at one side of said chamber, deflectors secured to said casing adjacent the member, which deflectors may be adjusted to a position wherein heated air from the member will be admitted into the car body, a passageway leading to the windshield communicating with the opposite side of said chamber, and adjustable means located in said chamber adapted when set in one position to cause heated air to be discharged from the heat radiating member into the car body and when set in another position to cause unheated air to flow through the passageway to the windshield.

3. In a heating device for vehicles, a casing having a chamber formed therein located inside the vehicle body, a conduit adapted to conduct air from outside the body into said chamber, a heat radiating member located in the casing at one side of said chamber, deflectors secured to said casing adjacent the member, which deflectors may be adjusted to a position wherein heated air from the member will be admitted into the car body, a passageway leading to the windshield communicating with the opposite side of said chamber, and a valve located in said chamber and adapted when adjusted to one position to cause heated air to be discharged from the heat radiating member into the car body, when adjusted to another position to cause unheated air to flow through the passageway to the windshield, and when adjusted to an intermediate position to cause heated air to be discharged from the heat radiating member into the car body and unheated air to flow through the passageway to the windshield.

4. In a heating device for vehicles, a casing having a chamber formed therein located inside the vehicle body, a conduit adapted to conduct air from outside the body into said chamber, a heat radiating member located in the casing at one side of said chamber, deflectors secured to said casing adjacent the member, which deflectors may be adjusted to a position wherein heated air from the member will be admitted into the car body, a blower supported on said casing at the opposite side of said chamber and communicating therewith, a passageway leading from the blower to the windshield, and an adjustable valve located in said chamber and adapted when set in one position to cause heated air to be discharged from the heat radiating member into the car body and when set in another position to cause unheated air to be withdrawn from the chamber by the blower when the latter is actuated and to cause such air to flow through the passageway to the windshield.

DOUGLAS B. WHITNEY.